United States Patent [19]

Schwander

[11] 4,033,973
[45] July 5, 1977

[54] OXADIAZOL-5-YL-COUMARIN DERIVATIVES

[75] Inventor: Hansrudolf Schwander, Riehen, Switzerland

[73] Assignee: Ciba-Geigy Corporation, Ardsley, N.Y.

[22] Filed: Mar. 25, 1976

[21] Appl. No.: 670,309

Related U.S. Application Data

[63] Continuation of Ser. No. 540,063, Jan. 10, 1975, abandoned, which is a continuation of Ser. No. 335,635, Feb. 26, 1973, abandoned.

[30] Foreign Application Priority Data

Apr. 18, 1972 Switzerland .................. 5691/72

[52] U.S. Cl. .................. 260/295 F; 260/294.9; 260/307 G; 260/247.2 B; 260/293.58; 8/1 D
[51] Int. Cl.² .................. C07D 413/14; C07D 413/04
[58] Field of Search ......... 260/307 G, 295 F, 294.9

[56] References Cited
UNITED STATES PATENTS 3,444,180  5/1969  Maeder et al. ................ 260/307 G
3,810,901  5/1974  Davidson et al. ............... 260/295 F
3,994,907  11/1976  Domergue ....................... 260/295 F Primary Examiner—Alan L. Rotman
Attorney, Agent, or Firm—Karl F. Jorda; Edward McC. Roberts; Michael W. Glynn

[57] ABSTRACT

Dyestuffs of the formula

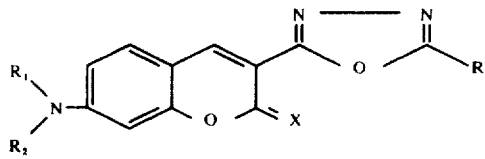

wherein $R_1$ and $R_2$ represent optionally substituted alkyl groups which can be interrupted by heteroatoms, and $R_1$ and $R_2$ together with the nitrogen atom at the aromatic nucleus are able to form a 5- or 6-membered ring, X represents a NH group or an oxygen atom and R represents an organic radical. the dyestuffs dye polyester fibers in brilliant yellow shades.

5 Claims, No Drawings

OXADIAZOL-5-YL-COUMARIN DERIVATIVES

This is a continuation of application Ser. No. 540,063, filed on Jan. 10, 1975, now abandoned, which was a continuation of Ser. No. 335,635 filed Feb. 26, 1973 (now abandoned).

The present invention provides valuable, new dyestuffs of the formula

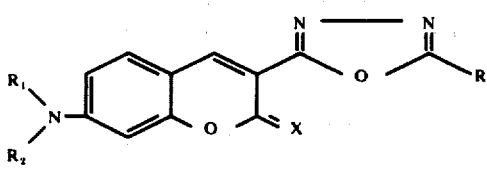

wherein $R_1$ and $R_2$ represent optionally substituted alkyl groups which can be interrupted by heteroatoms, and $R_1$ and $R_2$ together with the nitrogen atom at the aromatic nucleus can form a 5- or 6-membered ring, X represents a NH group or an oxygen atom and R represents an organic radical, but preferably represents an optionally substituted phenyl radical, a pyridine radical or a radical of the formula

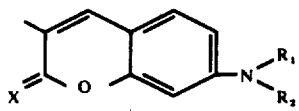

wherein $R_1$ and $R_2$ have the meaning given hereinabove.

The new dyestuffs are obtained by a. reacting together 1 molecular equivalent each of the cumaric acid of the formula

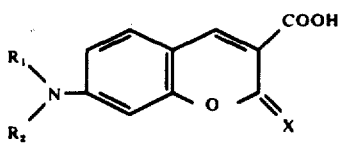

of hydrazine, and of the carboxylic acid of the formula

in any desired sequence until oxadiazole cyclisation takes place, in the presence of a dehydrating agent, or b. reacting a salicyclic aldehyde of the formula

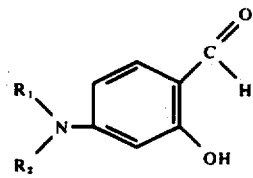

wherein $R_1$, $R_2$ and X have the same meanings as in the formula I, with a nitrile of the formula

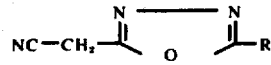

wherein R has the same meaning as in the formula I. R represents an aliphatic, araliphatic, cycloaliphatic, aromatic or heterocyclic radical. Examples of suitable aliphatic radicals are: lower alkyl groups, phenoxyalkyl groups, N-alkylated —$CONH_2$ groups or carbalkoxy groups. Examples of suitable araliphatic radicals are the benzyl or phenylethyl radical. Examples of suitable cycloaliphatic radicals are the cyclopentyl and the cyclohexyl radical. Examples of suitable aromatic radicals R are fluoroenyl, naphthyl or, preferably, phenyl radicals, which can be optionally substituted by halogen atoms, such as chlorine, bromine, fluorine, or by lower alkyl, lower alkoxy, lower carbalkoxy, optionally lower alkylated carboxylic amide, nitro, cyano, trifluoromethyl, hydroxyl and/or optionally lower alkylated amino groups. Examples of suitable heterocyclic radicals are pyridine, thiophene, furan, furfuryl, thiazole, benzthiazole or tetramethylenesulphone radicals, which may carry the same substituents as the phenyl radicals.

$R_1$ and $R_2$ represent alkyl radicals which can be the same or different, e.g. methyl, ethyl, propyl, butyl, pentyl, hexyl, heptyl, octyl, nonyl or decyl radicals, substituted alkyl radicals, such as β-chloroethyl, β-hydroxylethyl, β-cyanoethyl, γ-cyanopropyl, β-methoxyethyl, β-acetoxyethyl, β-butyryloxyethyl, methoxycarbonylethyl, ethoxycarbonylethyl, phenylethyl or benzyl radicals. Radicals $R_1$ and $R_2$ which are linked with each other form e.g. the piperidine or morpholine ring.

The preferred dyestuffs correspond to the formulae

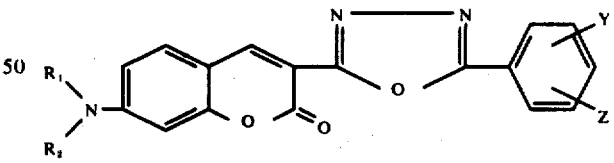

wherein Y and Z in each case represent lower alkyl, lower alkoxy or hydroxy groups, or represent halogen and/or hydrogen atoms,

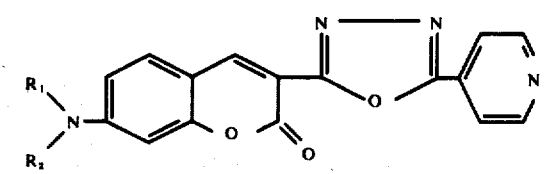

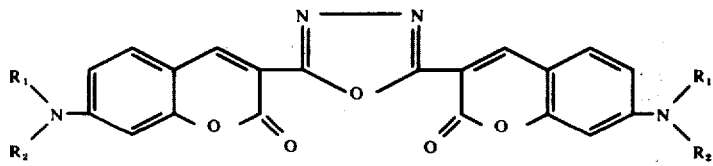

Manufacturing process a), in which 2 moles of carboxylic acid are reacted with 1 mole of hydrazine, is carried out stepwise according to a preferred embodiment of the invention. Firstly, one or both carboxylic acid components are reacted and then condensation is effected.

if initially the carboxylic acid of the formula

HOOC — R is reacted with hydrazine, the further reaction proceeds as follows

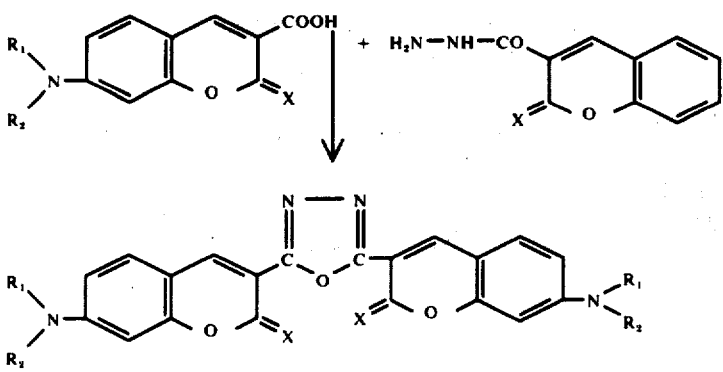

If both carboxylic acids are identical, the following exceptional case occurs

The last mentioned symmetrical dyestuffs are also usually formed as by-products if the components of the formulae

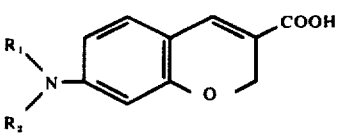

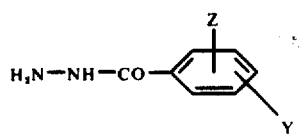

are condensed with each other.

It is possible to obtain the symmetrical dyestuffs by stepwise reaction with hydrazine by firstly manufacturing the dihydrazide of the formula

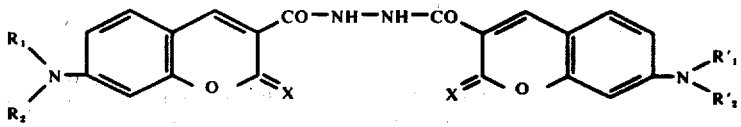

in conventional manner and then heating in the presence of dehydrating agents.

It is preferable to manufacture the symmetrical dyestuffs in the single step process from the components cited hereinabove.

If initially one molecule of acid is reacted with one molecule of hydrazine, then the second molecule of acid can combine additively as follows in the second step

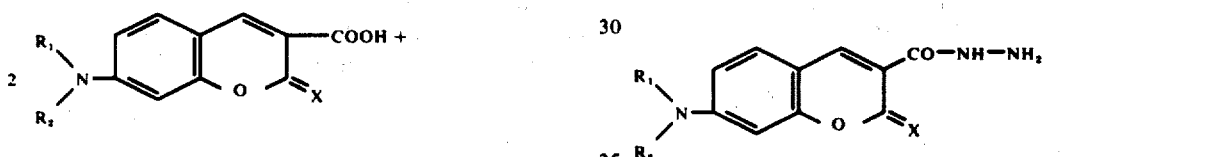

As dehydrating agents there are used, for example, phosphoroxy chloride, phosphorus pentoxide, concentrated sulphuric acid, oleum and, above all, polyphosphoric acid.

The dehydration is carried cut at 60° to 200° C, preferably 80° to 180° C. If hydrazides are used as intermediates steps, these are formed beforehand with the application of heat from hydrazine and the acids, acid esters or acid chlorides.

The new dyestuffs yield valuable dyestuff preparations, particularly after their conversion into a finely divided form, for example by wet or dry grinding, pasting, precipitation with textile auxiliaries, and/or organic solvents, above all with tensides.

Examples of dispersants of the non-ionic groups that can be used with advantage are: addition products of 8 mols of ethylene oxide with 1 ml of p-tert.-octylphenol, of 15 resp. 6 mols of ethylene oxide with castor oil, of 20 mols of ethylene oxide with the alcohol $C_{16}H_{33}OH$, ethylene oxide addition products with di-[α-phenylethyl]-phenols, polyethylene oxide-tert.-dodecylthioether, polyamine-polyglycol ether or addition products of 15 or 30 mols ot ethylene oxide with 1 mol of the amino $C_{12}H_{25}NH_2$ or $C_{18}H_{37}NH_2$.

As anionic dispersants there may be mentioned: sulphuric acid esters of alcohols of the fatty series having 8 to 20 carbon aatoms, of the ethyleneoxy adducts of the corresponding fatty acid amides, or of alkylated phenols having 8 to 12 carbon atoms in the alkyl radical; sulphonic acid esters with alkyl radicals having 8 to 20 carbon atoms; sulphation products of unsaturated fats and oils; phosphoric acid esters having 8 to 20 carbon atoms; fatty acid soaps also alkylaryl sulphonates, condensation products of formaldehyde with naphthalenesulphonic acid and lignin sulphonate.

Suitable cationic dispersants are quaternary ammonium compounds that contain alkyl or aralkyl radicals having 8 to 20 carbon atoms.

Examples of suitable organic solvents are: dimethyl formamide, dimethyl acetamide, dimethyl sulphoxide, tetramethylenesulphone, hexamethylphosphorus triamide or teramethyl urea. The dyestuffs can be in solution or in the form of a fine dispersion.

The new dyestuffs, their mixtures with one another and their mixtures with other azo dyestuffs are outstandingly suitable for dyeing and printing leather, wool, silk and above all synthetic fibres, for example, acrylic or acrylonitriles fibres of polyacrylonitriles or of copolymers, of acrylontrile and other vinyl compounds, such as acrylic esters, acrylamides, vinylpyridine, vinyl chloride or vinylidene chloride, copolymers of dicyanoethylene and vinyl acetate as well as acrylonitrile block copolymers, fibres of polyurethanes, polypropylene fibres such as, cellulose triacetate and cellulose 2½-acetate and especially fibres of polyamides, such as nylon 6, nylon 6,6 or nylon 12, and of aromatic polyesters, such as those from terephthalic acid and ethylene glycol or 1,4-dimethylcyclohexane, and copolymers of terephthalic acid and isophthalic acid and ethylene glycol.

For dyeing in aqueous liquors, the water-insoluble dyestuffs are appropriately used in a finely divided form, and dyeing is carried out with addition of dispersing agents, such as sulphite cellulose waste lye or synthetic detergents, or of a combination of different wetting agents and dispersing agents. As a rule it is advisable to convert the dyestuffs to be used, before dyeing, into a dyeing preparation which contains a dispersing agent and finely divided dyestuff in such as form that on dilution of the dyestuff preparations with water a fine dispersion is produced.

In order to achieve intense dyeings on polyethylene terephthalate fibres, it proves advisable to add a swelling agent to the dyebath, or to carry out the dyeing process under pressure at temperatures above 100° C, for example at 120° C. Suitable swelling agents are aromatic carboxylic acids, for exaple salicylic acid, phenols, such as, for example, o- or p-hydroxydiphenyl, aromatic halogen compounds, such as o-dichlorobenzene, or diphenyl.

For thermofixing the dyestuff, the padded polyester fabric is heated, appropriately after prior drying, for example in a warm stream of air, to temperatures of above 100° C, for example between 180° and 210° C. or treated with suberheated steam.

The dyeings obtained according to the present process can be subjected to an after-treatment, for example by heating with an aqueous solution of a non-ionic detergent.

Instead of being applied by impregnation, the compounds indicated can, according to the present process, also be applied by printing. For this purpose, for example, a printing ink is used which contains the finely disperse dyestuff in addition to the auxiliaries customary in printing, such as wetting agents and thickeners.

It is also possible to use the new water-insoluble compounds for the spin dyeing of polyamides, polyesters and polyolefines. The polymer to be dyed are appropriate in the form of powder, grains or chips, as ready prepared spinning solution or mixed in the fused state with the dyestuff, which is introduced in the dry state or in the form of a dispersion or solution in an optionally volatile solvent. After the dyestuff has been uniformly distributed in the solution or the melt of the polymer, the mixture is processed in known manner by pouring, moulding or extruding to fibres, yarns, monofilaments, films and the like.

The following Examples illustrate the invention, the parts and percentages being by weight unless otherwise stated.

EXAMPLE 1

A mixture consisting of 20.9 parts of the compound of the formula

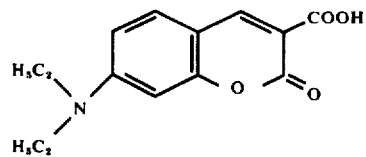

(obtained by saponification of the corresponding alkyl ester with dilute sodium hydroxide solution at 100° C) and 2.72 parts of hydrazine chlorihydrate is added to 200 parts of polyphosphoric acid at a temperature of 130° C, whereupon the resulting mixture is stirred for 1 hour at 130° to 135° C. 15 ml of water are added dropwise and then the mixture is poured on 1.1 liters of water which is at room temperature, in the process of which the resulting dyestuff precipitates as a fine filling. The mixture is heated to 50° C, stirred for 30 minutes at this temperature, and the dyestuff is then filtered off. The filter product is again suspended in 200 ml of water of 40° C, the pH is adjusted to 7 with sodium carbonate, the suspension is heated briefly to 60° C and the filling ot the dyestuff is filtered off with suction at 50° C. The dyestuff is washed with water of 50° C and then dried in vacuo at 70° C.

The dyestuff of the formula

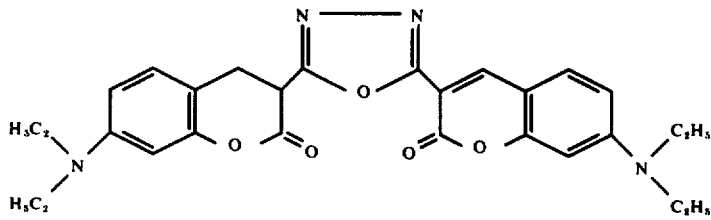

is obtained as a yellow powder which dissolves yellow in organic solvents. In daylight the solutions display a deep, yellowish green fluorescence. Brilliant greenish yellow dyeings of outstanding fastness to sublimation are obtained by applying the dyestuffs to polyester as a fine dispersion from an aqueous bath.

Dyestuffs with similar properties are obtained by using instead of diethylamino-coumarincarboxylic acid equivalent amounts of the corresponding N-dimethylamino- or N-dipropylamino-coumarin-carboxylic acid, and otherwise carrying out the same procedure.

EXAMPLE 2

A mixture consisting of 10.45 parts of 7-(N-diethylamino)-coumarin-3-carboxylic acid and 5.45 parts of benzhydrazide is added to 120 parts of a polyphosphoric acid at a temperature of 130° C and the resulting mixture is stirred for 5 hours at 130°–135° C. 5 ml of water are then added and the mixture is poured on 500 ml of water of 40° C. The resulting dyestuff filling is stirred cold for some time, then filtered, washed neutral with water and dried in vacuo at 70° C.

The resulting product constitutes a mixture of the dyestuffs of the formulae

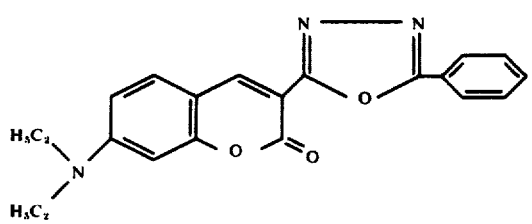

and

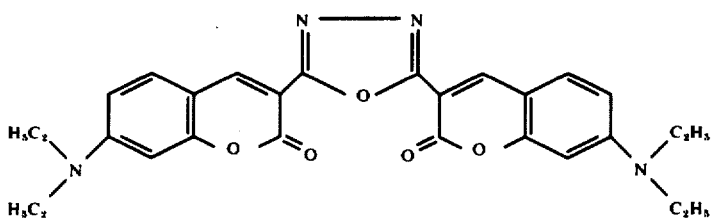

which, when applied as a fine dispersion from an aqueous bath, dyes polyester fabrics in brilliant greenish yellow shades of good fastness properties.

It is possible to resolve the dyestuff mixture into both its components, for example by chromatography on a silica gel column from a solution in a mixture of toluene/ acetone 4:1.

By using instead of benzhydrazide equivalent amounts of pyridine-4-carboxylic hydrazide and otherwise carrying out the same procedure, the dyestuff of the formula

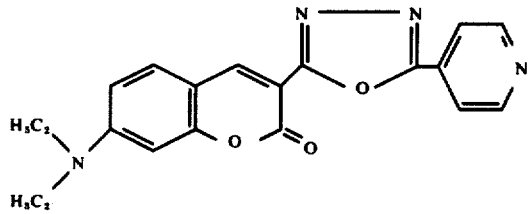

is obtained without admixture of the symmetrical biscoumaryl dyestuff. Applied from aqueous dispersion, the dyestuff dyes polyester fabric in brilliant greenish yellow shades of good fastness properties.

Dyestuffs with similar properties are obtained by using in the above Example equivalent amounts of the hydrazides listed in the Table below instead of benzhydrazide. These constitute mixtures of the dyestuff listed in the Table and the symmetrical biscoumaryl dyestuff of the above Example. The resulting dyestuff mixtures were resolved into their components in known manner by the means of column chromatography.

Table

| hydrazide | R |
|---|---|
| H₂N—HNOC—[C₆H₄-2-CH₃] | [C₆H₄-2-CH₃] |
| H₂N—HNOC—[C₆H₄-3-CH₃] | [C₆H₄-3-CH₃] |
| H₂N—HNOC—[C₆H₄-4-CH₃] | [C₆H₄-4-CH₃] |
| H₂N—HNOC—[C₆H₄-2-Cl] | [C₆H₄-2-Cl] |
| H₂N—HNOC—[C₆H₄-4-Cl] | [C₆H₄-4-Cl] |
| H₂N—HNOC—[C₆H₃-3,4-Cl₂] | [C₆H₃-3,4-Cl₂] |
| H₂N—HNOC—[C₆H₄-2-OH] | [C₆H₄-2-OH] |
| H₂N—HNOC—[C₆H₄-2-OCH₃] | [C₆H₄-2-OCH₃] |
| H₂N—HNOC—[C₆H₄-4-OCH₃] | [C₆H₄-4-OCH₃] |
| H₂N—HNOC—[C₆H₄-2-OC₂H₅] | [C₆H₄-2-OC₂H₅] |
| H₂N—HNOC—CON(CH₃)₂ | —CON(CH₃)₂ |
| H₂N—HNOC—CH₃ | —CH₃ |
| H₂N—HNOC—C₂H₅ | —C₂H₅ |
| H₂N—HNOC—C₃H₇ | —C₃H₇ |
| H₂N—HNOC—C₄H₉ | —C₄H₉ |
| H₂N—HNOC—[C₆H₅] | [C₆H₅] |
| H₂N—HNOC—CH₂—[C₆H₅] | —CH₂—[C₆H₅] |
| H₂N—HNOC—CH₂—O—[C₆H₅] | —CH₂—O—[C₆H₅] |
| H₂N—HNOC—COOC₂H₅ | —COOC₂H₅ |

EXAMPLE 3

A mixture consisting of 3.9 parts of 2-oxy-4-(N-diethylamino)-benzaldehyde, 4.1 parts of the compound of the formula (obtained by cyclisation of cyanacetyl-benzoyl-hydrazide with phosphoroxy chloride), 0.4 part of a glacial acetic acid, 0.2 part of piperidine and 20 parts of ethanol is stirred for 2 hours at a temperature of 80° C. The mixture is then cooled and the precipitated dyestuff is isolated by filtration. The resulting dyestuff of the formula can be obtained pure by recrystallization from e.g. ethyl cellosolve. It is identical with the corresponding dyestuff of Example 2 and displays the same tinctorial properties.

DYEING EXAMPLE

1 Part of the dyestuff obtained according to Example 1 is ground wet with 2 parts of a 50% aqueous of the sodium salt of dinaphthylmethane-disulphonic acid.

This dyestuff preparation is stirred with 40 parts of a 10% aqueous solution of the sodium salt of N-benzyl-$\mu$-heptadecyl-benzimidazole-disulphonic acid and 4 parts of a 40% acetic acid solution are added. A dyebath of 4000 parts by volume is prepared therefrom by dilution with water.

100 Parts of a purified polyester fibre material is put into this bath at 50° C, the temperature is raised within half an hour to 120°-130° C and dyeing is carried out for 1 hour at this temperature in a sealed vessel. The material is subsequently thoroughly rinsed. A full, yellow dyeing of excellent fastness to light and sublimation is obtained.

I claim:

1. A dyestuff of the formula wherein $R_1$ and $R_2$ independently represent methyl, ethyl, propyl, butyl, pentyl, hexyl, heptyl, octyl, nonyl, decyl, $\beta$-chloroethyl, $\beta$-hydroxyethyl, $\beta$-cyanoethyl, $\gamma$-cyanopropyl, $\beta$-methoxyethyl, $\beta$-acetoxyethyl, $\beta$-butyryloxyethyl, methoxycarbonylethyl, ethoxycarbonylethyl, phenylethyl or benzyl; and Y and Z independently represent lower alkyl, lower alkoxy, hydroxy, halo or hydrogen.

2. A dyestuff of the formula

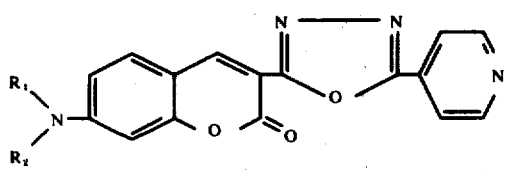

wherein
R₁ and R₂ independently represent methyl, ethyl, propyl, butyl, pentyl, hexyl, heptyl, octyl, nonyl, decyl, β-chloroethyl, β-hydroxyethyl, β-cyanoethyl, γ-cyanopropyl, β-methoxyethyl, β-acetoxyethyl, β-butylryloxyethyl, methoxycarbonylethyl, ethoxycarbonylethyl, phenylethyl or benzyl.

3. A dyestuff of the formula

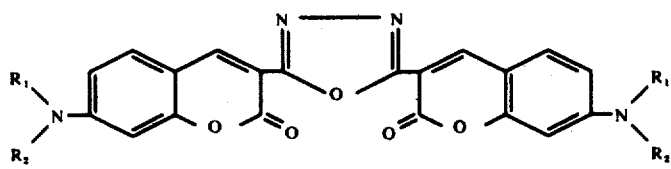

wherein
R₁ and R₂ independently represent methyl, ethyl, propyl, butyl, pentyl, hexyl, heptyl, octyl, nonyl, decyl, β-chloroethyl, β-hydroxyethyl, β-cyanoethyl, γ-cyanopropyl, β-methoxyethyl, β-acetoxyethyl, β-butyryloxyethyl, methoxycarbonylethyl, ethoxycarbonylethyl, phenylethyl or benzyl.

4. The dyestuff according to claim 3 of the formula

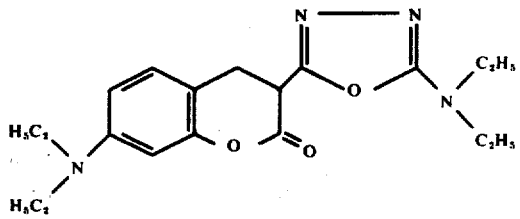

5. The dyestuff according to claim 2 of the formula

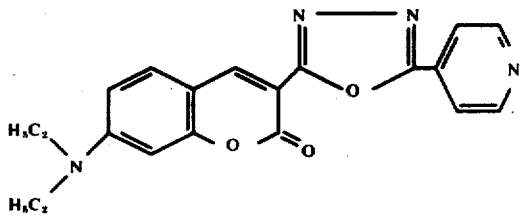

* * * * *